United States Patent
Tsai et al.

(10) Patent No.: US 9,891,428 B2
(45) Date of Patent: Feb. 13, 2018

(54) OPTICAL MEASUREMENT SYSTEM, MEASUREMENT METHOD FOR ERRORS OF ROTATING PLATFORM, AND TWO DIMENSIONAL SINE WAVE ANNULUS GRATING

(71) Applicant: Metal Industries Research & Development Centre, Kaohsiung (TW)

(72) Inventors: Hsiu-An Tsai, Tainan (TW); Nai-Chun An, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 161 days.

(21) Appl. No.: 14/960,451

(22) Filed: Dec. 7, 2015

(65) Prior Publication Data

US 2017/0160103 A1  Jun. 8, 2017

(51) Int. Cl.
*G01D 5/34*       (2006.01)
*G02B 26/08*      (2006.01)
*G02B 27/28*      (2006.01)
*G02B 5/30*       (2006.01)
*G01D 5/26*       (2006.01)
*G01D 5/347*      (2006.01)

(52) U.S. Cl.
CPC ......... *G02B 26/0816* (2013.01); *G01D 5/266* (2013.01); *G01D 5/3473* (2013.01); *G02B 5/3083* (2013.01); *G02B 27/283* (2013.01)

(58) Field of Classification Search
CPC .... G01D 5/344; G02B 27/283; G02B 5/3083; G02B 26/0816
USPC ........................................ 250/231.13–231.18
See application file for complete search history.

(56) References Cited

U.S. PATENT DOCUMENTS 6,262,802 B1 * 7/2001 Kiyono ............... G01B 11/002
                                                                 250/237 G
7,502,127 B2    3/2009 Gao et al.
(Continued)

FOREIGN PATENT DOCUMENTS

| CN | 1977144   | 6/2007  |
| CN | 102109331 | 6/2011  |
| CN | 103363902 | 10/2013 |

(Continued)

OTHER PUBLICATIONS

Adriane E. et al, "Position displacement, not velocity, is the cue to motion detection of second-order stimuli", Vision Research 38, Issue 22, Nov. 1998, 3569-3582.
(Continued)

*Primary Examiner* — Seung C Sohn
(74) *Attorney, Agent, or Firm* — JCIPRNET

(57) ABSTRACT

An optical measurement system including a two-dimensional sine wave annuls grating and a measurement unit is provided. The two-dimensional sine wave annuls grating includes a rotary shaft and a plurality of sine wave structures surrounding the rotary shaft and continuously arranged. The measurement unit is adapted to output a light beam towards the two-dimensional sine wave annuls grating, wherein each of the sine wave structures is adapted to reflect the light beam from the two-dimensional sine wave annuls grating back to the measurement unit. A measurement method for errors of a rotating platform and a two-dimensional sine wave annuls grating are also provided.

12 Claims, 5 Drawing Sheets

(56) References Cited

U.S. PATENT DOCUMENTS

| | | | |
|---|---|---|---|
| 7,773,234 B2 | 8/2010 | Jywe et al. | |
| 2015/0160043 A1* | 6/2015 | Hwang | G01D 5/30 356/614 |

FOREIGN PATENT DOCUMENTS

| | | |
|---|---|---|
| TW | 585988 | 5/2004 |
| TW | I220688 | 9/2004 |
| TW | 200521404 | 7/2005 |
| TW | I247095 | 1/2006 |
| TW | I256995 | 6/2006 |
| TW | 200804757 | 1/2008 |
| TW | I340679 | 4/2011 |

OTHER PUBLICATIONS

"Office Action of Taiwan Counterpart Application", dated Nov. 3, 2016, p. 1-p. 4.

* cited by examiner

OPTICAL MEASUREMENT SYSTEM, MEASUREMENT METHOD FOR ERRORS OF ROTATING PLATFORM, AND TWO DIMENSIONAL SINE WAVE ANNULUS GRATING

BACKGROUND OF THE INVENTION

1. Field of the Invention

The invention relates to an optical measurement system, a measurement method for errors of a rotating platform, and a two-dimensional sine wave annulus grating.

2. Description of Related Art

Rotating platforms are key instruments in the equipment for middle and high level manufacturing processes, and are broadly used in high-precision industrial processes, such as ultra-precision manufacturing and/or processing and optoelectronic semiconductor manufacturing processes. Currently, the accuracy of the rotating platform is inspected by testing the geometric precision and positioning precision of the rotating platform by using a measurement instrument such as the laser interferometer, the autocollimator, or the electronic level meter, etc. Since these instruments are adapted for off-line measurements, and correction processes are respectively required for installation of these instruments and alignment of the reference shaft, the current process for correcting the rotating platform is very time-consuming. In addition, since measurement paths measured when correcting the rotating platform may not be completely identical, errors may be introduced through multiple correction processes. The uncertainty of measurement is thus increased. Furthermore, when inspecting the accuracy of the rotating platform, the operation of the manufacturing equipment (e.g., the machine tool) must be suspended, which results in decrease in production. Thus, measuring the errors of the rotating platform in real-time on the production line will significantly help the precision correction process of the rotating platform.

SUMMARY OF THE INVENTION

The invention provides an optical measurement system capable of measuring errors of a rotating platform in real-time.

The invention also provides a measurement method for errors of a rotating platform and a two-dimensional sine wave annuls grating adapted for the optical measurement system.

An optical measurement system according to an embodiment of the invention includes a two-dimensional sine wave annuls grating and a measurement unit. The two-dimensional sine wave annuls grating includes a rotary shaft and a plurality of sine wave structures surrounding the rotary shaft and arranged continuously. The measurement unit is adapted for outputting a light beam toward the two-dimensional sine wave annuls grating. Each of the sine wave structures is adapted to reflect the light beam from the measurement unit back to the measurement unit.

According to an embodiment of the invention, shapes of cutting lines of the two-dimensional sine wave annuls grating on a first reference plane perpendicular to the rotary shaft and a second reference plane perpendicular to the first reference plane respectively include a plurality of continuous sine waves.

According to an embodiment of the invention, the measurement unit includes a light source, a light detector, and a beam splitter. The light source provides the light beam. The light detector receives the light beam reflected by each of the sine wave structures. The beam splitter is located on a transmitting path of the light beam from the light source and a transmitting path of the light beam reflected by the two-dimensional sine wave annuls grating, and adapted to transmit the light beam reflected by the two-dimensional sine wave annuls grating to the light detector.

According to an embodiment of the invention, the light source is a laser light source, and the light detector is a quadrant photo-diode (QPD) or a charge coupled device (CCD).

According to an embodiment of the invention, the beam splitter is a polarizing beam splitter. The measurement unit further includes a quarter-wave plate. The quarter-wave plate is disposed between the beam splitter and the two-dimensional sine wave annuls grating.

According to an embodiment of the invention, the measurement unit further includes a collimating lens set, a first focusing lens, and a second focusing lens. The collimating lens set is located between the light source and the beam splitter. The first focusing lens is located between the beam splitter and the two-dimensional sine wave annuls grating. The second focusing lens is located between the beam splitter and the light detector.

According to an embodiment of the invention, the light source and the two-dimensional sine wave annuls grating are respectively located at opposite sides of the beam splitter. In addition, the measurement unit further includes a reflective element. The light beam reflected by the two-dimensional sine wave annuls grating is transmitted to the light detector after being sequentially reflected by the beam splitter and the reflective element.

An embodiment of the invention provides a measurement method for errors of a rotating platform. The method includes steps as follows. An optical measurement system including a two-dimensional sine wave annuls grating and a measurement unit provided. The two-dimensional sine wave annuls grating is configured at the rotating platform and includes a rotary shaft and a plurality of sine wave structures surrounding the rotary shaft and arranged continuously. The measurement unit emits light beam is emitted toward the two-dimensional sine wave annuls grating. The measurement units obtains a radial position variation signal and an axial position variation signal according to the light beam reflected by the sine wave structures. A rotating angle of the two-dimensional sine wave annuls grating is calculated based on the radial position variation signal. A roll error of the two-dimensional sine wave annuls grating is calculated based on intensities of the axial position variation signal when the rotating angle is 0 degrees and 180 degrees. In addition, a pitch error of the two-dimensional sine wave annuls grating is calculated based on intensities of the axial position variation signal when the rotating angle is 90 degrees and 270 degrees.

According to an embodiment of the invention, the measurement unit includes a quadrant photo-diode or a charge coupled device.

An embodiment of the invention provides a two-dimensional sine wave annuls grating. The two-dimensional sine wave annuls grating is adapted to be configured at a rotating platform. In addition, the two-dimensional sine wave annuls grating includes a rotary shaft and a plurality of sine wave structures surrounding the rotary shaft and arranged continuously.

According to an embodiment of the invention, shapes of cutting lines of the two-dimensional sine wave annuls grating on a first reference plane perpendicular to the rotary shaft and a second reference plane perpendicular to the first reference plane respectively include a plurality of continuous sine waves.

Based on above, since the two-dimensional sine wave annuls grating may be configured at the rotating platform and rotate with the rotating platform, and an energy intensity of the light beam reflected by the two-dimensional sine wave annuls grating may change with the surface fluctuation of the sine wave structures, the optical measurement system may calculate the rotating angle, roll error, and pitch error of the rotating platform based on the radial position variation signal and the axial position variation signal generated after the measurement unit receives the reflected light beam. Accordingly, the optical measurement system according to the embodiments of the invention is capable of measuring the errors (including the roll error and the pitch error) of the rotating platform in real-time. Moreover, the measurement method for the errors of the rotating platform and the two-dimensional sine wave annuls grating according to the embodiments of the invention are adapted for the optical measurement system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
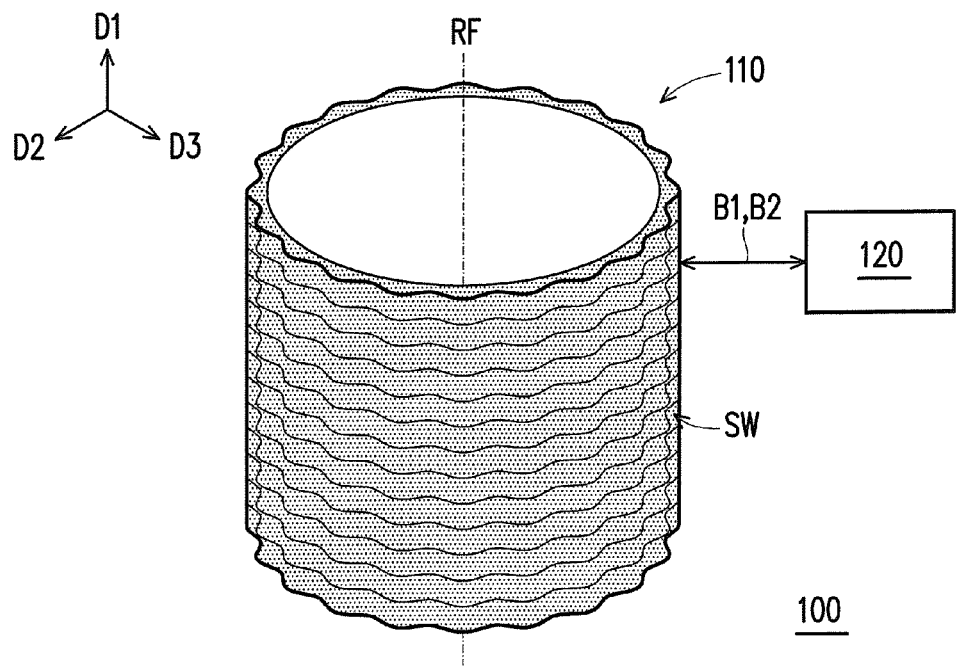
FIG. 1A is a schematic view illustrating an optical measurement system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
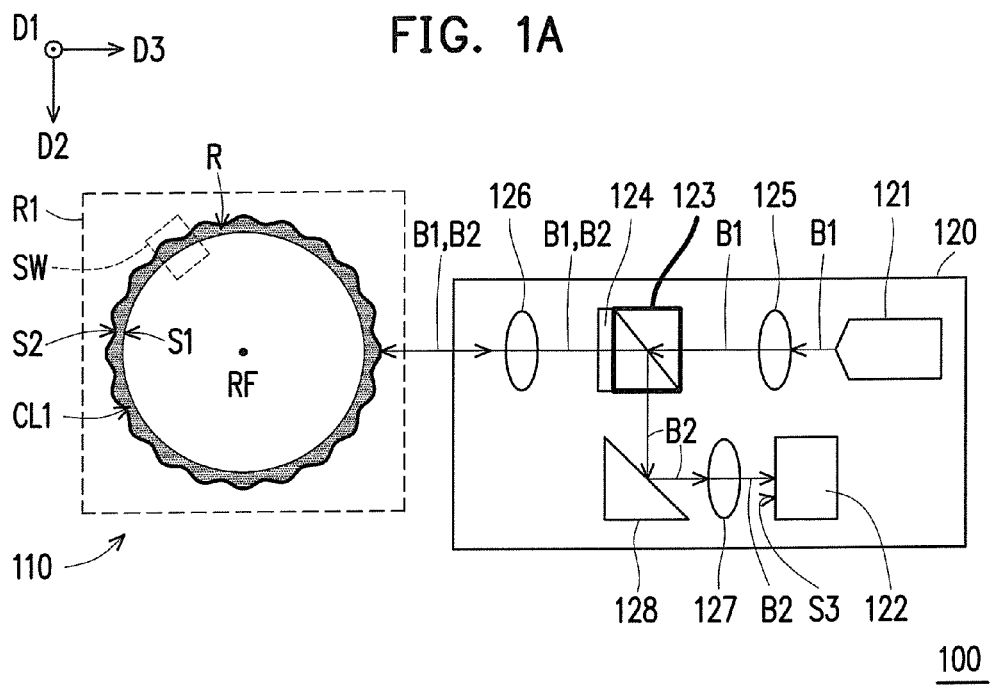
FIG. 1B is a schematic top view illustrating the optical measurement system shown in FIG. 1A.
Figure 1C:
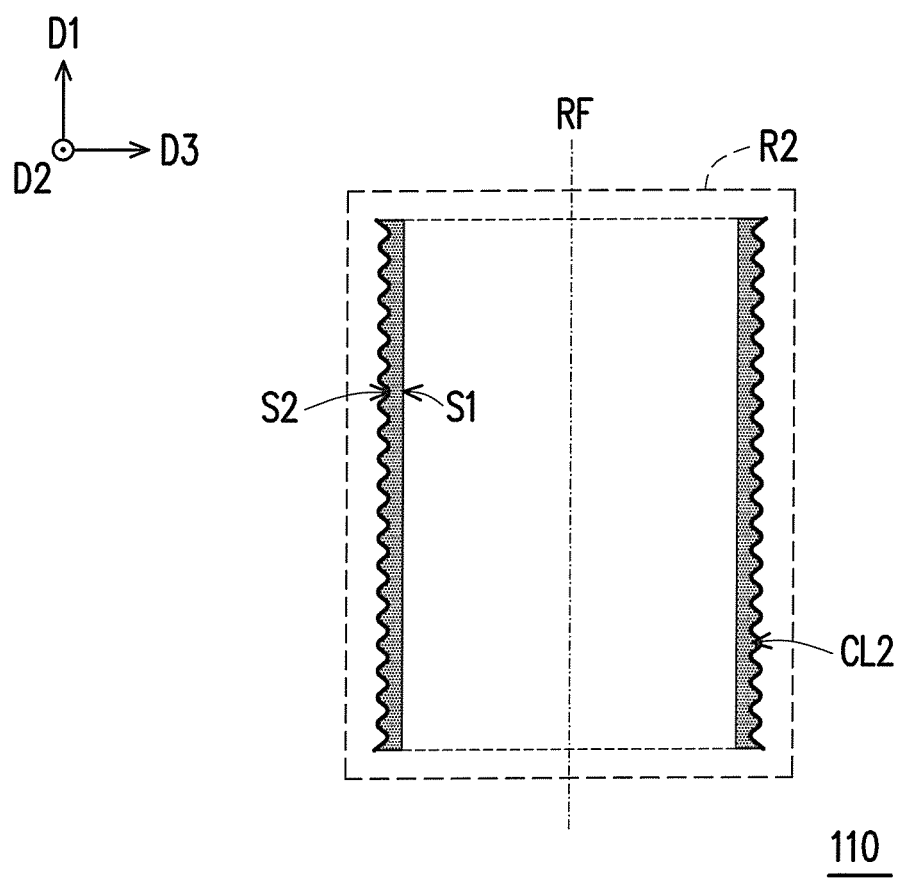
FIG. 1C is a schematic cross-sectional view illustrating a two-dimensional sine wave annuls grating shown in FIG. 1A.

FIG. 1A is a schematic view illustrating an optical measurement system according to an embodiment of the invention. FIG. 1B is a schematic top view illustrating the optical measurement system shown in FIG. 1A. FIG. 1C is a schematic cross-sectional view illustrating a two-dimensional sine wave annuls grating shown in FIG. 1A. Referring to FIGS. 1 A to 1C, an optical measurement system 100 includes a two-dimensional sine wave annuls grating 110 and a measurement unit 120. The two-dimensional sine wave annuls grating 110 includes a rotary shaft RF and a plurality of sine wave structures SW surrounding the rotary shaft RF and arranged continuously.

More specifically, the sine wave structures SW are connected with each other along an annulus path, and form a plurality of rings R in a first direction D1 parallel to the rotary shaft RF. The rotary shaft RF passes through the center of each of the rings R, and each of the rings R is parallel to a plane formed by a second direction D2 and a third direction D3, wherein the first direction D1, the second direction D2, and the third direction D3 are perpendicular to each other. In addition, the rings R are serially connected along the first direction D1 and aligned to each other in the first direction D1. Referring to FIGS. 1B and 1C, a shape of a cutting line CL1 of the two-dimensional sine wave annuls grating 110 on a first reference plane R1 perpendicular to the rotary shaft RF and a shape of a cutting line CL2 of the two-dimensional sine wave annuls grating 110 on a second reference plane R2 perpendicular to the first reference plane R1 respectively include a plurality of continuous sine waves.

More specifically, the two-dimensional sine wave annuls grating 110 has an inner surface S1 and an outer surface S2, wherein the inner surface S1 is located between the rotary shaft RF and the outer surface S2. In an embodiment, the inner surface Si of the two-dimensional sine wave annuls grating 110 may not change with the fluctuation of the outer surface S2. More specifically, in the two-dimensional sine wave annuls grating 110, only the shapes of the cutting lines of the outer surface S2 on the first reference plane R1 and the second reference plane R2 include a plurality of continuous sine waves (as shown in thick profile lines of the two-dimensional sine wave annuls grating 110 shown in FIGS. 1B and 1C'), while a shape of a cutting line of the inner surface S1 on the first reference plane R1 is circular (as shown in thin profile lines of the two-dimensional sine wave annuls grating 110 shown in FIG. 1B). Moreover, a shape of a cutting line of the inner surface S1 on the second reference plane R2 is a straight line (as shown in thin profile line of the two-dimensional sine wave annuls grating 110 shown in FIG. 1C).

Figure 2:
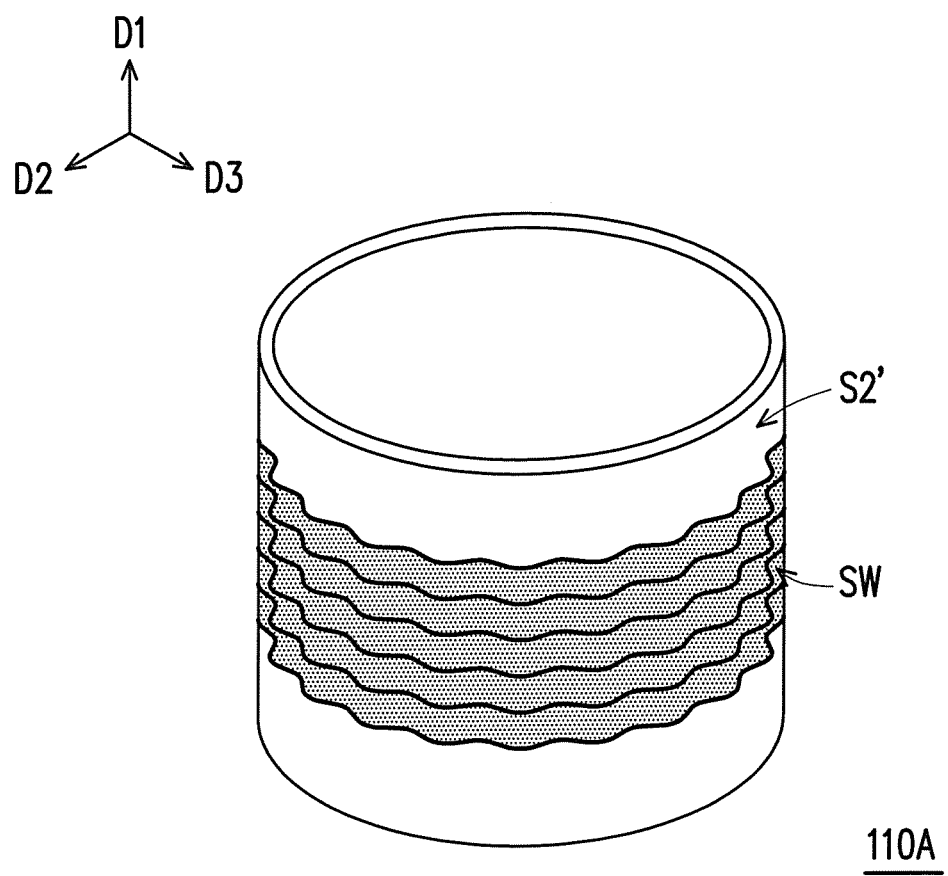
FIG. 2 is a schematic view illustrating a two-dimensional sine wave annuls grating according to another embodiment of the invention.

It should be noted that, even though the outer surface S2 of the two-dimensional sine wave annuls gratings 110 is described as a fluctuating surface in general, the invention is not limited thereto. FIG. 2 is a schematic view illustrating a two-dimensional sine wave annuls grating according to another embodiment of the invention. Referring to FIG. 2, in a two-dimensional sine wave annuls grating 110A, the sine wave structures SW may only be formed in a partial region (e.g., a middle region) of the two-dimensional sine wave annuls grating 110A. Accordingly, an outer surface ST of the two-dimensional sine wave annuls grating 110A is only partially fluctuating.

Referring to FIGS. 1A and 1B again, the measurement unit 120 is adapted to output a light beam B1 toward the two-dimensional sine wave annuls grating 110, wherein each of the sine wave structures SW is adapted to reflect the light beam B1 from the measurement unit 120 back to the measurement unit 120.

Referring to FIG. 1B, the measurement unit 120 may include a light source 121, a light detector 122, and a beam splitter 123. The light source 121 provides a light beam B1. For example, the light source 121 may be a laser light source. However, the invention is not limited thereto. The light detector 122 receives a light beam B2 reflected by each of the sine wave structures SW. For example, the light detector 122 may be a quadrant photo-diode. However, the invention is not limited thereto. For example, the light detector 122 may also be a charge coupled device. The beam splitter 123 is located on a transmitting path of the light beam B1 from the light source 121 and on a transmitting path of the light beam B2 reflected by the two-dimensional sine wave annuls grating 110, and is adapted to transmit the light beam B2 reflected by the two-dimensional sine wave annuls grating 110 to the light detector 122. For example, the beam splitter 123 may be a polarizing beam splitter. However, the invention is not limited thereto. In this embodiment, the measurement unit 120 may further include a quarter-wave plate 124, wherein the quarter-wave plate 124 is disposed between the beam splitter 123 and the two-dimensional sine wave annuls grating 110.

Based on different design needs, the measurement unit 120 may further include other components. For example, the measurement unit 120 may further includes a collimating lens set 125, a first focusing lens 126, and a second focusing lens 127. The collimating lens set 125 is located between the light source 121 and the beam splitter 123, and may collimate the light beam B1 from the light source 121. The collimating lens set 125 may include one or more lenses, and the lens may be a single lens or a cemented lens. The first focusing lens 126 is located between the beam splitter 123 and the two-dimensional sine wave annuls grating 110, and may converge the light beam B1 from the beam splitter 123 to the sine wave structures SW of the two-dimensional sine wave annuls grating 110. The second focusing lens 127 is located between the beam splitter 123 and the light detector 122, and may converge the light beam B2 from the beam splitter 123 to the light detector 122.

In this embodiment, the light source 121 and the two-dimensional sine wave annuls grating 110 are respectively located at opposite sides of the beam splitter 123, wherein the beam splitter 123 is adapted for the light beam B1 from the light source 121 to pass, and the beam splitter 123 reflects the light beam B2 from the two-dimensional sine wave annuls grating 110. The measurement unit 120 may further include a reflective element 128. The reflective element 128 may be any element capable of reflecting light, such as a reflector or a beam splitter. The light beam B2 reflected by the two-dimensional sine wave annuls grating 110 is transmitted to the light detector 122 after being sequentially reflected by the beam splitter 123 and the reflective element 128. More specifically, the light beam B1 from the light source 121 is transmitted to the two-dimensional sine wave annuls grating 110 after sequentially passing through the collimating lens set 125, the beam splitter 123, the quarter-wave plate 124, and the first focusing lens 126. The sine wave structures SW of the two-dimensional sine wave annuls grating 110 reflect the light beam B1, and the light beam B2 reflected by the two-dimensional sine wave annuls grating 110 is transmitted back to the first focusing lens 126 along the original path, sequentially reflected by the beam splitter 123 and the reflecting mirror 128 after sequentially passing through the first focusing lens 126 and the quarter-wave plate 124, and then converged to the light detector 122 through the second focusing lens 127.

Nevertheless, the invention is not limited thereto. In another embodiment, a light receiving surface S3 of the light detector 122 may directly face toward the beam splitter 123. In this way, the reflecting mirror 128 may be omitted. In yet another embodiment, positions of the light detector 122 and the light source 121 may be switched.

Figure 3:
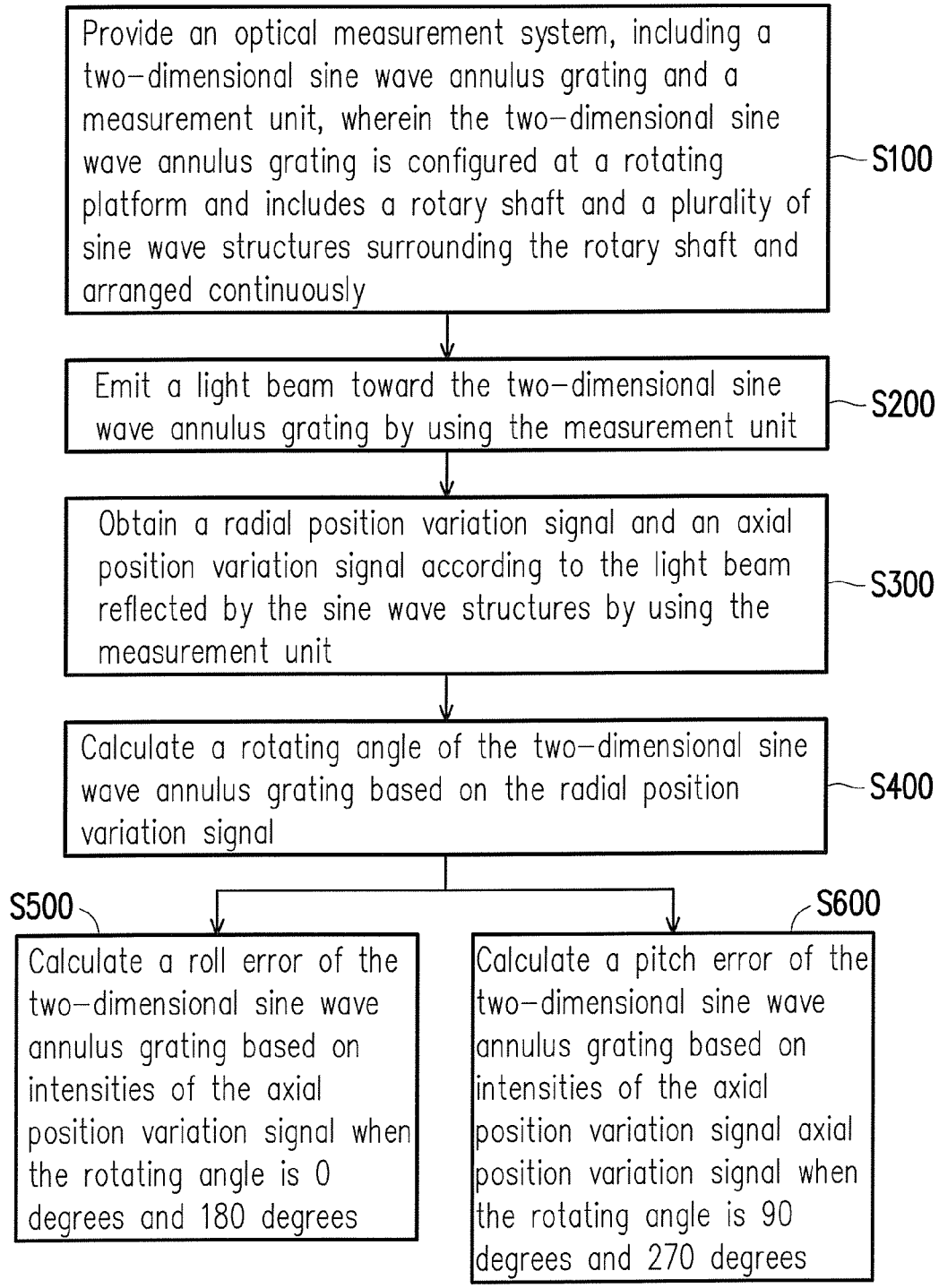
FIG. 3 is a flowchart illustrating a measurement method for errors of a rotating platform according to an embodiment of the invention.
Figure 4A:
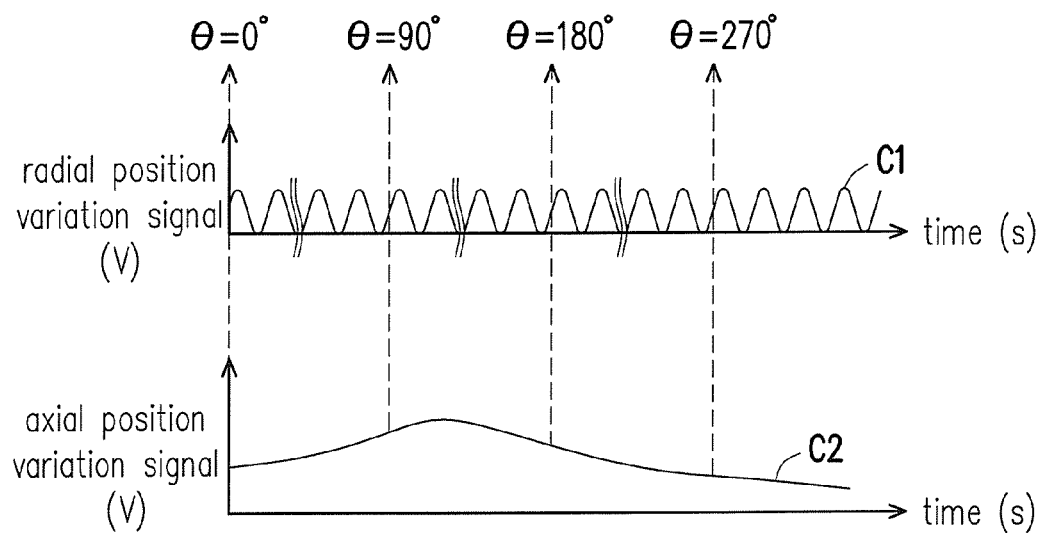
FIG. 4A is a view illustrating a radial position variation signal and an axial position variation signal generated after a measurement unit shown in FIG. 1B receives a reflected light beam.
Figure 4B:
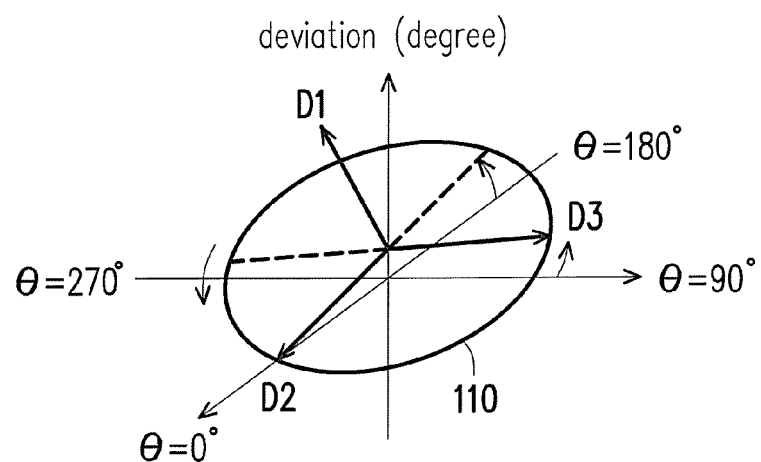
FIG. 4B is a schematic view illustrating that a two-dimensional sine wave annuls grating is deviated based on the axial position variation signal of FIG. 4A.

In the following, a measurement method for errors of a rotating platform according to an embodiment of the invention is described in detail with reference to FIGS. 1B, 3, and 4B. FIG. 3 is a flowchart illustrating a measurement method for errors of a rotating platform according to an embodiment of the invention. FIG. 4A is a view illustrating a radial position variation signal and an axial position variation signal generated after a measurement unit shown in FIG. 1B receives a reflected light beam. FIG. 4B is a schematic view illustrating that a two-dimensional sine wave annuls grating is deviated based on the axial position variation signal of FIG. 4A.

Referring to FIGS. 1B, 3, and 4C, the measurement method for the errors of the rotating platform includes steps as follows. First of all, the optical measurement system 100 is provided. The optical measurement system 100 includes the two-dimensional sine wave annuls grating 110 (may be replaced with the two-dimensional sine wave annuls grating 110A shown in FIG. 2) and the measurement unit 120. The two-dimensional sine wave annuls grating 110 is configured at the rotating platform (not shown) and includes the rotary shaft RF and the sine wave structures SW surrounding the rotary shaft RF and arranged continuously (Step S100). More specifically, the two-dimensional sine wave annuls grating 110 may be disposed on the rotating platform, and the rotary shaft RF of the two-dimensional sine wave annuls grating 110 may be disposed in correspondence with a rotary shaft of the rotating platform or disposed in correspondence with a main shaft of a machine tool disposed on the rotating platform.

Then, the light beam B1 is emitted from the measurement unit 120 toward the two-dimensional sine wave annuls grating 110 (Step S200). Afterwards, the measurement unit 120 obtains a radial position variation signal and an axial position variation signal according to the light beam B2 reflected by the sine wave structures SW (Step S300). More specifically, the measurement unit 120 includes a quadrant photo-diode or a charge coupled device (referring to the light detector 122 shown in FIG. 1B). After the quadrant photo-diode or the charge coupled device receives the light beam B2, a light intensity is converted into a voltage signal (unit: volt). The voltage signal includes the radial position variation signal and the axial position variation signal. Intensities of the radial position variation signal and the axial position variation signal correspond to a position of the sine wave structure SW irradiated by the light beam B1. The intensity of the radial position variation signal corresponds to a change of a rotating angle θ of the two-dimensional sine wave annuls grating 110, whereas the intensity of the axial position variation signal corresponds to a change of deviation of the two-dimensional sine wave annuls grating 110. Since the two-dimensional sine wave annuls grating 110 is configured at the rotating platform, the two-dimensional sine wave annuls grating 110 may also rotate when the rotating platform rotates. Accordingly, the rotating angle θ of the two-dimensional sine wave annuls grating 110 corresponds to a rotating angle of the rotating platform, and a deviation of the two-dimensional sine wave annuls grating 110 corresponds to a deviation of the rotating platform.

Referring to FIGS. 1B and 4A, when the two-dimensional sine wave annuls grating 110 rotates using the rotary shaft RF as the shaft, the light beam B1 from the measurement unit 120 may irradiate multiple sine wave structures SW continuously, and a light intensity of the reflected light beam B2 may vary in accordance with the position of the sine wave structure SW irradiated by the light beam B1. For example, the light intensity of the light beam B2 may change in correspondence with the fluctuation of the outer surface S2 of the sine wave structures SW. For example, when the light beam B1 irradiates a peak of the sine wave structure SW, the reflected light beam B2 has a maximum light intensity, and when the light beam B1 irradiates a trough of the sine wave structure SW, the reflected light beam has a minimum light intensity. Thus, an intensity of the radial position variation signal (as shown by a curve C1, for example) also shows a periodic sine wave change, and the number of a sine wave W corresponds to the number of the sine wave structure SW irradiated by the light beam B1. By coupling a computing unit (e.g., a computer) to the measurement unit 120, the computing unit may calculate the rotating angle θ of the two-dimensional sine wave annuls grating 110 based on the radial position variation signal (Step S400). For example, the computing unit may determine the number of the sine wave structures SW irradiated by the light beam B1 based on the number of the sine waves W in FIG. 4A, and then compare the number of the sine wave structures SW irradiated by the beam B1 with the total number of the sine wave structures SW of the respective rings R, so as to obtain the rotating angle θ.

In a condition that the rotating platform is not deviated, the two-dimensional sine wave annuls grating 110 configured at the rotating platform is not deviated, either.

Thus, the axial position variation signal is at a constant value (e.g., 0). In a condition that the rotating platform is deviated (dynamic error), the two-dimensional sine wave annuls grating 110 configured at the rotating platform is also deviated, and an intensity of the axial position variation signal may change with the deviation of the two-dimensional sine wave annuls grating 110 (corresponding to the deviation of the rotating platform). Also, the intensity of the axial position variation signal is positively correlated with the deviation of the rotating platform, for example. Thus, the computing unit may calculate the deviation of the two-dimensional sine wave annuls grating 110 (as shown in FIG. 4B) based on the intensity of the axial position variation signal (as shown in a curve C2 shown in FIG. 4A, for example), so as to obtain the deviation of the rotating platform.

Specifically, the computing unit may calculate a roll error of the two-dimensional sine wave annuls grating 110 based on intensities of the axial position variation signal when the rotating angle θ is 0 degrees and 180 degrees (Step S500, i.e., deviations of the two-dimensional sine wave annuls grating 110 when the rotating angle θ is 0 degrees and 180 degrees). Besides, the computing unit may also calculate a pitch error of the two-dimensional sine wave annuls grating 110 based on intensities of the axial position variation signal when the rotating angle θ is 90 degrees and 270 degrees (Step S600, i.e., deviations of the two-dimensional sine wave annuls grating 110 when the rotating angle θ is 90 degrees and 270 degrees).

Since the axial position variation signal and the radial position variation signal are measured and obtained simultaneously, the rotating angles θ that the axial position variation signal and the radial position variation signal correspond to at the same time point are the same. Thus, after the computing unit calculates time points when the rotating angle θ is 0 degrees, 90 degrees, 180 degrees, and 270 degrees by using the radial position variation signal, the intensities of the axial position variation signal when the rotating angle θ is 0 degrees, 90 degrees, 180 degrees, and 270 degrees may be obtained. Accordingly, the dynamic errors (including the roll error and the pitch error) of the two-dimensional sine wave annuls grating 110 are calculated based on Steps S500 and S600.

In an embodiment, the computing unit may be coupled to a control module controlling the rotating platform. When the computing unit finds that the rotating platform has dynamic errors, the computing unit may outputs a compensation signal to the control module in real-time, so as to compensate the dynamic errors of the rotating platform. In this way, a negative effect caused by the dynamic errors of the rotating platform to a precision process may be eliminated, and a precision of the precision process may be improved.

In view of the foregoing, since the two-dimensional sine wave annuls grating may be configured at the rotating platform and rotate with the rotating platform, and an energy intensity of the light beam reflected by the two-dimensional sine wave annuls grating may change with the surface fluctuation of the sine wave structures, the optical measurement system may calculate the rotating angle, roll error, and pitch error of the rotating platform based on the radial position variation signal and the axial position variation signal generated after the measurement unit receives the reflected light beam. Compared with the conventional instruments such as the laser interferometer, the autocollimator, or the electronic level meter, etc., the optical measurement system according to the embodiments of the invention is not only capable of measuring the errors of the rotating platform in real-time, but also capable of reducing errors and decrease in production due to a plurality of correcting processes in the conventional art. Besides, since the optical measurement system does not require a plurality of light sources or a plurality of light detectors to realize multiple degrees of freedom measurements, and the two-dimensional sine wave annuls grating may be integrated into the high-precision rotating platform in the conventional multiple-shaft tool system, the optical measurement system reduces the structural complexity as well as size as compared to the conventional optical measurement system with multiple degrees of freedom and makes it easier to be integrated into the rotating platform. In an embodiment, the measurement method for the errors of the rotating platform may further compensate the dynamic errors of the rotating platform (e.g., the roll error of the pitch error), so as to improve the precision in a process having a precision requirement.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical measurement system, comprising:
   a two-dimensional sine wave annuls grating, comprising a rotary shaft and a plurality of sine wave structures surrounding the rotary shaft and arranged continuously; and
   a measurement unit, adapted for outputting a light beam toward the two-dimensional sine wave annuls grating, wherein each of the sine wave structures is adapted to reflect the light beam from the measurement unit back to the measurement unit.

2. The optical measurement system as claimed in claim 1, wherein shapes of cutting lines of the two-dimensional sine wave annuls grating on a first reference plane perpendicular to the rotary shaft and a second reference plane perpendicular to the first reference plane respectively comprise a plurality of continuous sine waves.

3. The optical measurement system as claimed in claim 1, wherein an inner surface of the two-dimensional sine wave annuls grating changes with fluctuation of an outer surface of the two-dimensional sine wave annuls grating.

4. The optical measurement system as claimed in claim 1, wherein the measurement unit comprises:
   a light source, providing the light beam;
   a light detector, receiving the light beam reflected by each of the sine wave structures; and
   a beam splitter, located on a transmitting path of the light beam from the light source and a transmitting path of the light beam reflected by the two-dimensional sine wave annuls grating, and adapted to transmit the light beam reflected by the two-dimensional sine wave annuls grating to the light detector.

5. The optical measurement system as claimed in claim 4, wherein the light source is a laser light source, and the light detector is a quadrant photo-diode.

6. The optical measurement system as claimed in claim 4, wherein the beam splitter is a polarizing beam splitter, and the measurement unit further comprises:
   a quarter-wave plate, disposed between the beam splitter and the two-dimensional sine wave annuls grating.

7. The optical measurement system as claimed in claim 4, wherein the measurement unit further comprises:
   a collimating lens set, located between the light source and the beam splitter;
   a first focusing lens, located between the beam splitter and the two-dimensional sine wave annuls grating; and
   a second focusing lens, located between the beam splitter and the light detector.

8. The optical measurement system as claimed in claim 4, wherein the light source and the two-dimensional sine wave annuls grating are respectively located at opposite sides of the beam splitter, and the measurement unit further comprises:
   a reflective element, wherein the light beam reflected by the two-dimensional sine wave annuls grating is transmitted to the light detector after being sequentially reflected by the beam splitter and the reflective element.

9. A measurement method for errors of a rotating platform, comprising:
   providing an optical measurement system, comprising a two-dimensional sine wave annuls grating and a measurement unit, wherein the two-dimensional sine wave annuls grating is configured at the rotating platform and comprises a rotary shaft and a plurality of sine wave structures surrounding the rotary shaft and arranged continuously;
   emitting a light beam toward the two-dimensional sine wave annuls grating by using the measurement unit;
   obtaining a radial position variation signal and an axial position variation signal according to the light beam reflected by the sine wave structures by using the measurement unit;
   calculating a rotating angle of the two-dimensional sine wave annuls grating based on the radial position variation signal;
   calculating a roll error of the two-dimensional sine wave annuls grating based on intensities of the axial position variation signal when the rotating angle is 0 degrees and 180 degrees; and
   calculating a pitch error of the two-dimensional sine wave annuls grating based on intensities of the axial position variation signal when the rotating angle is 90 degrees and 270 degrees.

10. The measurement method for the errors of the rotating platform as claimed in claim 9, wherein the measurement unit comprises a quadrant photo-diode.

11. A two-dimensional sine wave annuls grating, adapted to be configured at a rotating platform, wherein the two-dimensional sine wave annuls grating comprises a rotary shaft and a plurality of sine wave structures surrounding the rotary shaft and arranged continuously.

12. The two-dimensional sine wave annuls grating as claimed in claim 11, wherein shapes of cutting lines of the two-dimensional sine wave annuls grating on a first reference plane perpendicular to the rotary shaft and a second reference plane perpendicular to the first reference plane respectively comprise a plurality of continuous sine waves.

* * * * *